United States Patent [19]

Kono

[11] Patent Number: 4,899,640

[45] Date of Patent: Feb. 13, 1990

[54] HYDRAULIC BOOSTER

[75] Inventor: Teruhisa Kono, Hyogo, Japan

[73] Assignee: Sumitomo Electric Industries, Ltd., Osaka, Japan

[21] Appl. No.: 249,417

[22] Filed: Sep. 23, 1988

[30] Foreign Application Priority Data

Sep. 25, 1987 [JP] Japan ............................ 62-241793

[51] Int. Cl.⁴ .............................................. F15B 9/10
[52] U.S. Cl. .................................. 91/369.7; 91/378; 60/548
[58] Field of Search .................. 91/369.2, 376 R, 378, 91/390, 49, 47; 60/548, 547.1

[56] References Cited

U.S. PATENT DOCUMENTS

| | | | |
|---|---|---|---|
| 2,318,756 | 5/1943 | Chouings | 91/376 R X |
| 4,179,980 | 12/1979 | Kito et al. | 91/49 X |
| 4,379,423 | 4/1983 | Leineweber et al. | 91/378 X |
| 4,415,210 | 11/1983 | Belart et al. | |
| 4,523,791 | 6/1985 | Belart et al. | |
| 4,548,037 | 10/1985 | Farr | 91/369.2 X |
| 4,642,990 | 2/1987 | Mizusawa | 60/578 X |

FOREIGN PATENT DOCUMENTS

| | | | |
|---|---|---|---|
| 2073346 | 10/1981 | United Kingdom | 91/378 |
| 2102519 | 2/1983 | United Kingdom | 91/378 |

OTHER PUBLICATIONS

SAE Technical Paper Series 840465, Society of Automotive Engineers, Inc., U.S.A.

Primary Examiner—Robert E. Garrett
Assistant Examiner—Mark A. Williamson
Attorney, Agent, or Firm—W. G. Fasse; D. H. Kane, Jr.

[57] ABSTRACT

A hydraulic booster has a boost piston (19) which receives the thrust of boost pressure generated in a boost chamber (15) to move the boost piston for urging a master piston (12) of a master cylinder in a brake applying direction. An input member (17) is relatively movably with respect to the boost piston (19). A pressure regulating device has an input directional control valve (22, 45) for allowing or cutting off communication between the boost chamber (15) and an auxiliary power source (14). An output directional control valve (24, 46) establishes or cuts off communication between the boost chamber (15) and a reserve tank (9). The boost piston (19), the input member (17) and the pressure regulating device are arranged inside a housing (1). An input member positioning device brings the rear end of the input member (17) into contact with a stop member (51) which is anchored to the housing (1), when a pedal force is zero for stopping a rearward movement of the input member. A boost piston positioning device balances the force that pushes the boost piston (19) in a rearward direction with a force that pushes the boost piston (19) in a forward or frontward direction by boost pressure when the pedal force is zero thereby to stop a rearward movement of the boost piston.

3 Claims, 6 Drawing Sheets

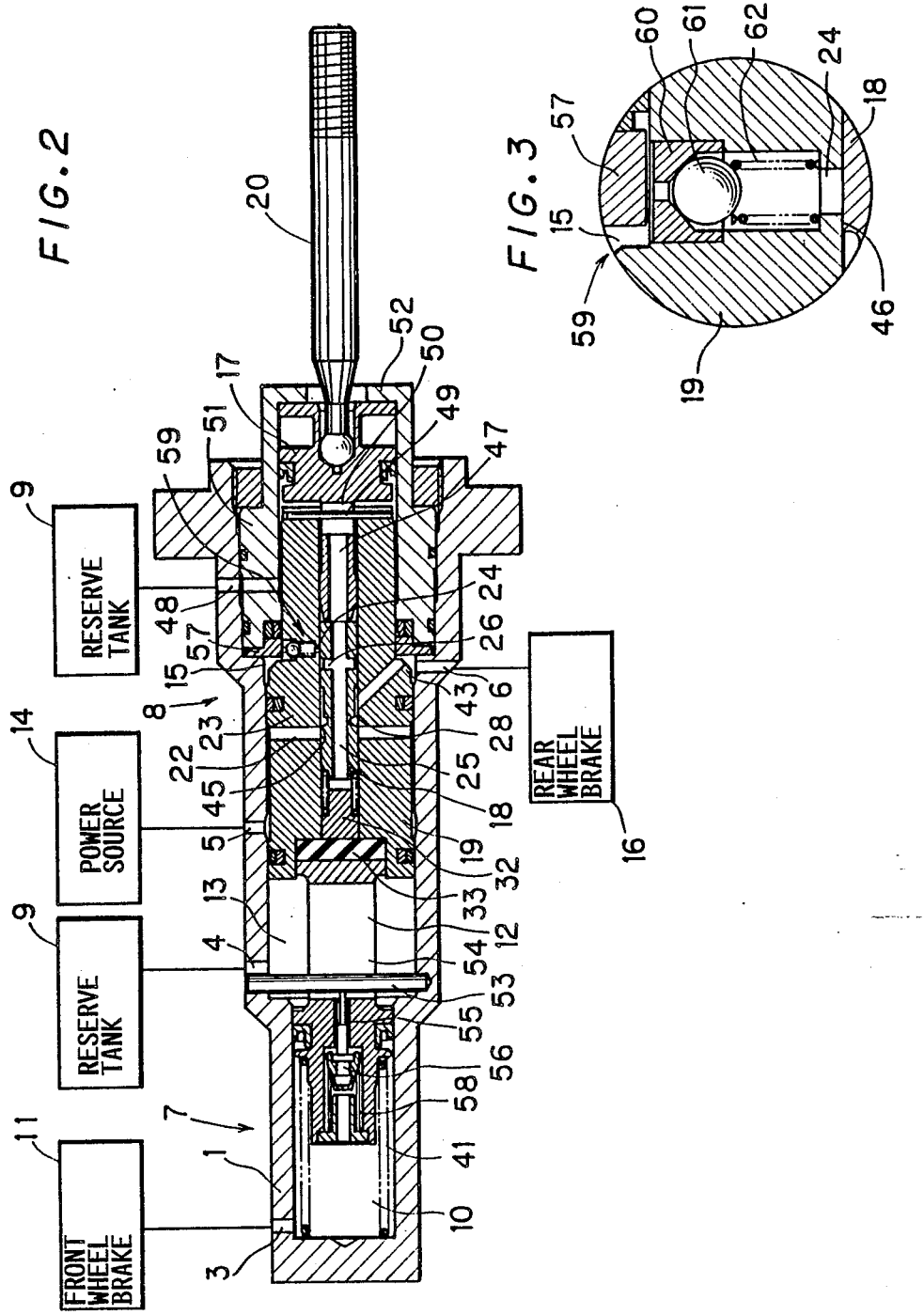

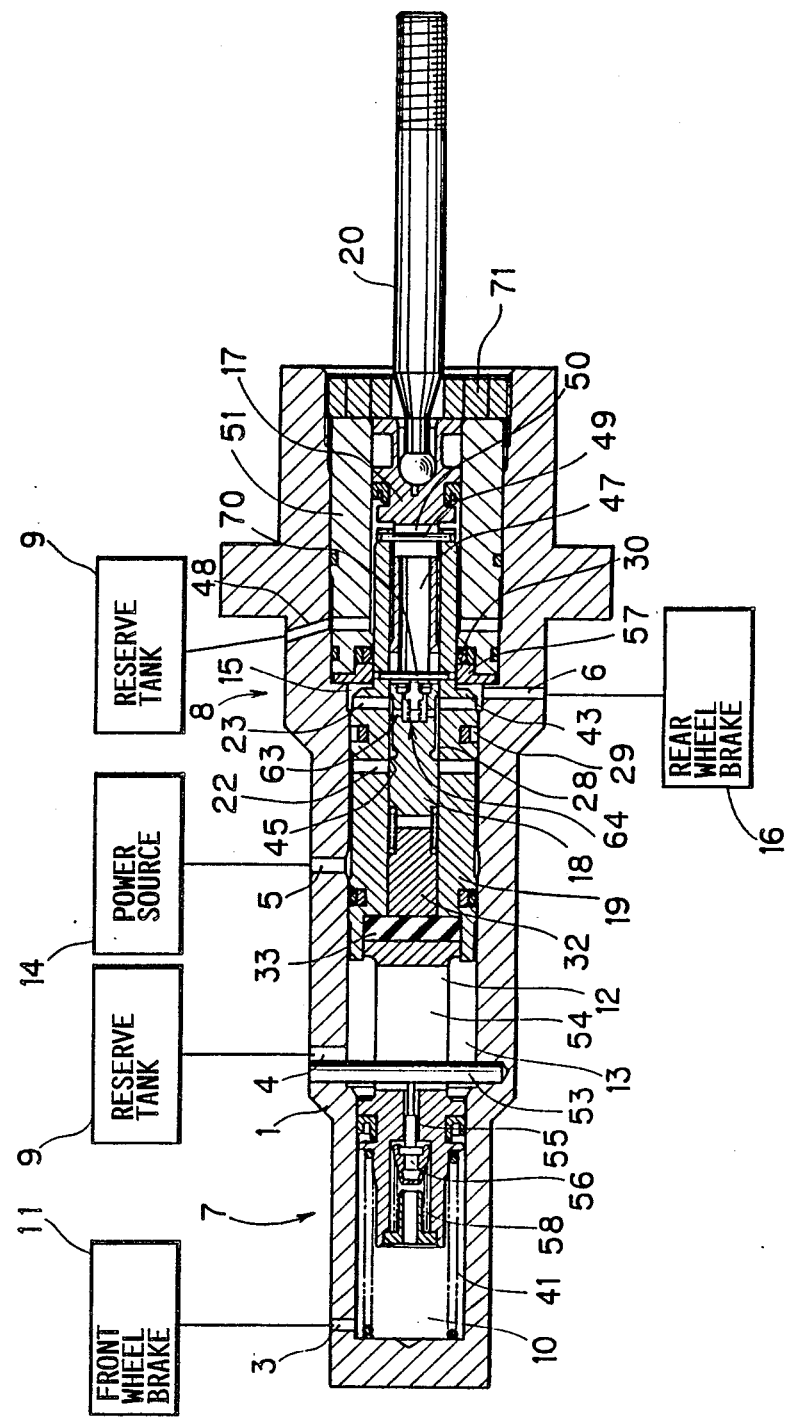

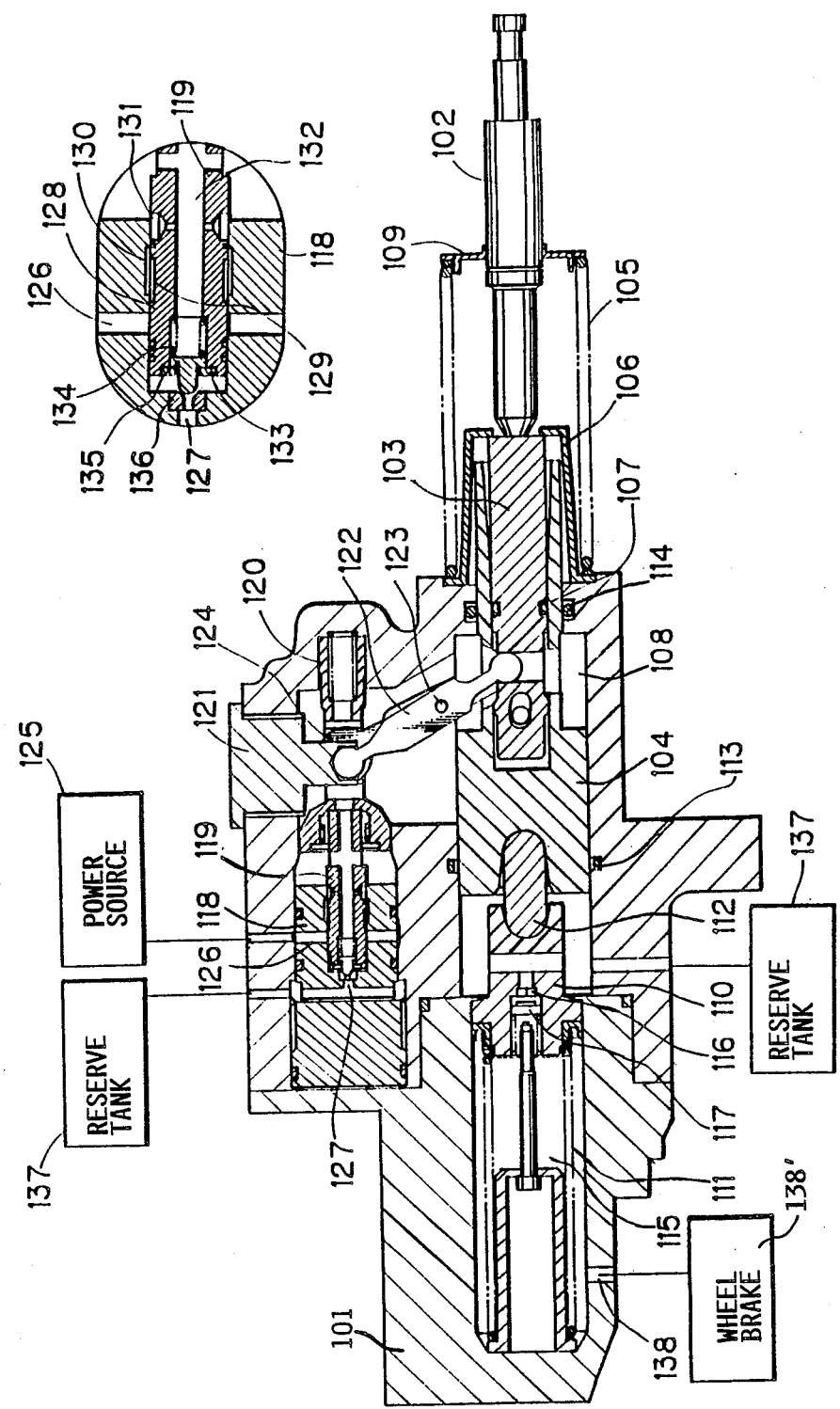

4,899,640

HYDRAULIC BOOSTER

FIELD OF THE INVENTION

The present invention relates to a hydraulic booster which is applied to a pressure source for pressurizing a brake for a vehicle, and more particularly, it relates to a hydraulic booster which is adapted to reduce travel loss in an initial stage of braking.

BACKGROUND INFORMATION

In order to assist the pedal force which is applied to a brake pedal of a vehicle for pressurizing a master cylinder, generally employed is a vacuum booster utilizing vacuum pressure generated in an intake manifold of an engine. On the other hand, a system of performing an antilocking control of a wheel brake for a vehicle through use of an auxiliary power source regularly storing high auxiliary dynamic pressure has come into wide use in recent years. It is known that a hydraulic booster is employed to utilize hydraulic pressure from the auxiliary power source in this case. Such a hydraulic booster can be easily reduced in size and increased in magnification as compared with the vacuum booster. Thus, the hydraulic booster can be integrated with a master cylinder and an antilocking control apparatus, to be easily mounted on a vehicle. For example, Japanese Patent Laying-Open Gazette No. 104449/1982 discloses a hydraulic booster which is integrated with an antilocking apparatus.

FIG. 9 is a sectional view showing a typical example of a hydraulic booster, which is integrated with a master cylinder.

A master cylinder 7 and a hydraulic booster 8 are integrated into a housing 1, which is provided with ports 2, 3, 4, 5 and 6. The port 2 is adapted to introduce fluid from a reserve tank 9 into a pressure chamber 10 of the master cylinder 7, and the port 3 is adapted to discharge the fluid from the pressure chamber 10 toward a front wheel brake 11. The port 4 is adapted to discharge fluid exhausted from the hydraulic booster 8 to the reserve tank 9 through a chamber 13 which is provided on an outer peripheral portion of a master piston 12 of the master cylinder 7. The port 5 is adapted to guide auxiliary dynamic pressure from an auxiliary power source 14 to the booster 8, while the port 6 is adapted to guide boost pressure formed in a boost chamber 15 of the booster 8 to a rear wheel brake 16.

The booster 8 comprises an input member 17, a spool 18 and a boost piston 19. The input member 17 is coupled to an input rod 20 which is driven by a brake pedal, and the spool 18 is coupled to the input member 17. The input member 17 and the spool 18 are relatively movable with respect to the boost piston 19.

The boost piston 19 is provided with a communication hole 21 which extends from its outer peripheral portion to a central opening, an input hole 22, a communication hole 23 and an output hole 24. The spool 18 is provided with a central communication hole 25 which is formed in its central portion and communication holes 26 and 27 connecting its outer peripheral portion with the central communication hole 25. Further, a small groove 28 is defined on the outer peripheral portion of the spool 18.

Two seals 29 and 30 are provided to hold the communication hole 23 and the output hole 24 of the boost piston 19 between the same. The boost chamber 15 is formed in a stepped portion of the boost piston 19, which is sealed by the two seals 29 and 30.

As shown in FIG. 9, further, a plunger 32 having a communication hole 31 in its interior is contained in the central opening of the boost piston 19.

In the state shown in FIG. 9, the input hole 22 of the boost piston 19 is closed by the outer peripheral surface of the spool 18, whereby the auxiliary dynamic pressure transmitted from the auxiliary power source 14 through the port 5, the outer peripheral portion of the boost piston 19 and the input hole 22 is interrupted by the spool 18. Further, the boost chamber 15, which is connected with the rear wheel brake 16 through the port 6, communicates with the reserve tank 9 through the communication hole 26 and the central communication hole 25 of the spool 18, the communication hole 31 of the plunger 32, the communication hole 21 of the boost piston 19 and the chamber 13 provided on the outer peripheral portion of the master piston 12.

The master piston 12 is coupled to the boost piston 19, with a reaction disc 33 being interposed between the same. In the housing 1, a holddown member 34 is fixed in a position opposite to the master piston 12 by the pressure chamber 10. The holddown member 34 contains in its central opening a filter 35 which faces the port 2 communicating with the reserve tank 9 and a valve seat 36.

A rod 38 having a ball valve 37 for closing the valve seat 36 is movably contained in the pressure chamber 10. The rod 38 is urged by a spring 39 toward the valve seat 36. In the state shown in FIG. 9, the rod 38 is engaged with a cap 40 which is mounted on an end portion of the master piston 12 for preventing the rod 38 to move to the left in FIG. 9. In this state, the ball valve 37 is separated from the valve seat 36. Thus, the pressure chamber 10 of the master cylinder 7 communicates with the reserve tank 9 in the state shown in FIG. 9. Further, a master spring 41 is provided between the holddown member 34 and the master piston 12, to separate the master piston 12 from the holddown member 34.

In the state shown in FIG. 9, no pedal force is applied through the brake pedal. In this state, the boost piston 19 is rearwardly, i.e., rightwardly urged by the master spring 41 and auxiliary dynamic pressure from the auxiliary power source 14, which acts on an effective sectional area difference between the seals 29 and 29' (29>29'). A shoulder portion 43 of the boost piston 19 facing the boost chamber 15 comes into contact with a seal holder 42 which is fixed to the housing 1, thereby to stop such rearward movement of the boost piston 19.

A C-shaped snap ring 44 is fixedly mounted on a rear end portion of the boost piston 19. The rear end portion of the input member 17 comes into contact with the C-shaped snap ring 44, thereby to define the terminating end of its rearward movement.

The hydraulic booster 8, which is integrated with the master cylinder 7, operates as follows.

When a braking operation is started and the input rod 20 coupled to the brake pedal, moves to a pressurizing side, the spool 18 is brought into contact with the plunger 32, to compress and deform the reaction disc 33, which is made of rubber. At this time, communication between the output hole 24 of the boost piston 19 and the communication hole 26 of the spool 18 is cut off. The input hole 22 of the boost piston 19 communicates with the small groove 28 of the spool 18, whereby the auxiliary dynamic pressure from the auxiliary power source 14 is introduced into the boost chamber 15 through the port 5, the input hole 22, the small groove 28 and the communication hole 23. Then the boost piston 19 is driven in the forward direction by boost pressure acting on an area difference between sealing portions of the seals 29 and 30, to compress the reaction disc 33.

The reaction force of the disc 33 thus compressed is increased by the mechanism of a reaction disc which is well known in relation to a vacuum booster, and such increased reaction force is transmitted to the spool 18 through the plunger 32. Consequently, the spool 18 returns to its original position, whereby the communication between the input hole 22 of the boost piston 19 and the small groove 28 of the spool 18 is again cut off. At this time, the communication hole 26 of the spool 18 does not communicate with the output hole 24 of the boost piston 19. Consequently, boost pressure which is responsive to the thrust of the input rod 20 is generated in the boost chamber 15, to push the master piston 12.

When the master piston 12 thus moves to the left in FIG. 9, the rod 38 having the valve 37 is driven by the spring 39 to close the valve seat 36. When the thrust of the input rod 20 is increased in this state, the master cylinder 7 is pressurized by a repetition of the aforementioned operation.

When no pedal force is applied to the input rod 20 in the apparatus shown in FIG. 9, the boost pressure must be reduced to zero to bring the boost piston 19 into contact with the seal holder 42 by closing an input directional control valve for allowing or cutting off communication between the auxiliary power source 14 and the boost chamber 15 while opening an output directional control valve for allowing or cutting off communication between the boost chamber 15 and the reserve tank 9. In the known apparatus shown in FIG. 9, spool type input and output directional control valves are defined by the input hole 22 provided in the boost piston 19, the introduction hole 23 to the boost chamber 15, the output hole 24 from the boost chamber 15 and the spool 18.

When the input member 17 and the boost piston 19 rest in the rearmost positions as shown in FIG. 9, an input edge 45 of the spool 18 is lapped over the input hole 22 by $l_1$, thereby to cut off communication through the input hole 22, the small groove 28, the introduction hole 23 and the boost chamber 15. On the other hand, an output edge 46 of the spool 18 and the output hole 24 are opened by $l_2$, to allow communication through the boost chamber 15, the output hole 24, the communication hole 26, the central communication hole 25, the communication hole 31, the chamber 13 and the reserve tank 9. The boost pressure in the boost chamber 15 is zero in this case.

Upon starting a braking operation in the aforementioned conventional hydraulic booster, a travel loss is caused before the hydraulic booster starts its operation, which causes an undesirable pedal feeling. Namely, when pedal force is applied to the input rod 20, the input member 17 starts to move forward with the spool 18. When the spool 18 moves forward toward the front end by the stroke of $l_2$, the output directional control valve defined by the output edge 46 of the spool 18 and the output hole 24 is closed. When the spool 18 further moves forward still by the stroke of $l_1 - l_2$, the input directional control valve defined by the input edge 45 of the spool 18 and the input hole 22, is opened. Thus, travel loss of the length $l_1$ is caused before the booster 8 starts its normal operation. Consequently, a pedal travel is wasted by the product of the travel loss and a pedal ratio, to cause a spongy pedal feeling which is undesirable.

It is extremely difficult to reduce the lap length $l_1$ and $l_2$, in view of a needed working accuracy. Namely, the length $l_1$ of the lap portion between the input edges 45 and the input hole 22 must be larger than the length $l_2$ of the lap portion between the output hole 24 and the output edge 46 in the first place. If the length $l_1$ is reduced while maintaining such relation, leakage of auxiliary hydraulic pressure is increased in a non-braking state. Thus, the more often such an auxiliary hydraulic pressure generator is operated, the more energy is wasted. If the length $l_2$ is reduced, further, a delay is caused in the pressure reduction due to an area reduction of the fluid passages. In the apparatus shown in FIG. 9, therefore, the travel loss in an initial stage of a braking action by the hydraulic booster cannot be reduced.

The aforementioned problem is not specific to the hydraulic booster shown in FIG. 9. A similar problem is caused in a hydraulic booster which positions the input member 17 rearwardly by the boost piston 19 while moving back the boost piston 19 by the housing 1, since it is necessary to reliably close the input directional control valve while opening the output directional control valve in an inactive state when a pedal force is not applied. For example, the aforementioned problem is caused in an apparatus having pressure regulating means separated from the body of a boost piston by a lever, which is disclosed in Japanese Patent Laying-Open Gazette No. 145655/1984. Further, a similar problem is also caused in an apparatus employing a concentric valve member formed by concentrically arranging input and output directional control valves similar to those of a conventional vacuum booster in place of a spool valve, which is disclosed in SAE Technical Paper Series 840465, Society of Automotive Engineers, Inc., U.S.A.

SUMMARY OF THE INVENTION

Accordingly, it is an object of the present invention to provide a hydraulic booster which can solve the aforementioned problem of the prior art. In other words, the present invention is directed to a hydraulic booster which can reduce travel loss in an initial stage of a braking action.

A hydraulic booster according to the present invention has a boost chamber and receives auxiliary dynamic pressure from an auxiliary power source in response to operation of a brake pedal to generate a boost pressure which is proportional to the pedal force in the boost chamber, thereby to assist the thrust of a master cylinder by the boost pressure. The present hydraulic booster comprises a boost piston, an input member, pressure regulating means, a housing, input member positioning means and boost piston positioning means.

The boost piston has a portion directed to its rear end facing the boost chamber and receives the thrust of the boost pressure to move toward its front end side, for urging forward a master piston of the master cylinder.

The input member is relatively movable with respect to the boost piston, and frontwardly receives an input which is proportional to the pedal force, while rearwardly receiving reaction force which is proportional to the boost pressure.

The pressure regulating means has an input directional control valve for allowing or cutting off communication between the boost chamber and the auxiliary power source and an output directional control valve for allowing or cutting off communication between the boost chamber and a reserve tank which is open to the atmosphere. When the input member is relatively positioned ahead of a prescribed position with respect to the boost piston, the boost pressure is increased by opening the input directional control valve and closing the output directional control valve. When the input member is relatively positioned behind a prescribed position with respect to the boost piston, on the other hand, the boost pressure is reduced by closing the input directional control valve and opening the output directional control valve.

The housing contains the boost piston, the input member and the pressure regulating means in its interior.

The input member positioning means brings the rear end of the input member into contact with the housing or a stop member anchored to the housing when no pedal force is applied, thereby to stop rearward movement of the input member.

The boost piston positioning means balances the force for rearwardly pushing the boost piston with the force for frontwardly pushing the boost piston by the boost pressure when no pedal force is applied, thereby to stop a rearward movement of the boost piston.

According to the present invention, the input member is rearwardly positioned not by the boost piston but by the housing, while the boost piston is rearwardly positioned not by the housing but by balancing with the boost pressure. In an inactive state without any application of a pedal force, therefore, the boost pressure is not completely reduced to zero by closing of the input directional control valve and opening of the output directional control valve. This arrangement is not at all similar to the conventional case. According to the present invention, the input directional control valve is in a critical position for a transition from an open state to a closed state, whereby the boost pressure is balanced with the force for rearwardly urging the boost piston.

Therefore, when only the boost piston moves relatively with respect to the input member which is positioned by the housing, the output directional control valve is closed and the input directional control valve is opened. Consequently, the boost pressure is increased and the boost piston moves again frontwardly with respect to the input member, whereby the input directional control valve is closed. The boost pressure is balanced with the force for rearwardly urging the boost piston, thereby to position the boost piston. In this state, therefore, the output directional control valve is completely closed and the input directional control valve is in the critical position for transition from the open state to the closed state. If the input member moves slightly forward at the beginning of a braking operation, the input directional control valve is opened to start the boosting action. Thus, the travel loss can be reduced to the minimum.

Thus, according to the present invention, the travel loss has been reduced in an initial stage of the braking action, thereby preventing waste of auxiliary dynamic pressure.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a sectional view showing a second embodiment of the present invention;

FIG. 3 is an enlarged view of a differential pressure regulating valve shown in FIG. 2;

FIG. 4 is a sectional view showing a third embodiment of the present invention;

FIG. 7 is a sectional view showing a fourth embodiment of the present invention;

FIG. 8 is an enlarged view showing the structure of a part relating to a spool shown in FIG. 7.

DESCRIPTION OF THE PREFERRED EMBODIMENTS

Figure 1:
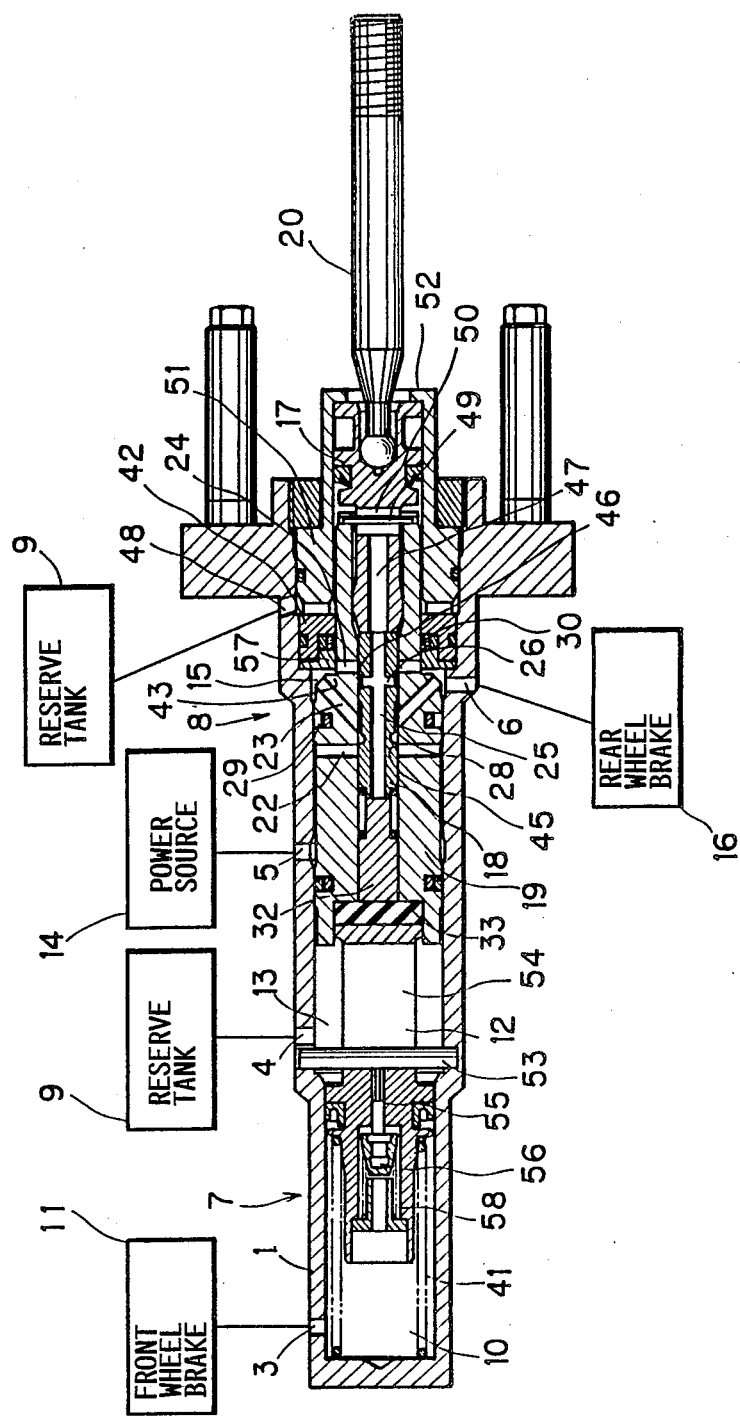
FIG. 1 is a sectional view showing a first embodiment of the present invention.
Figure 9:
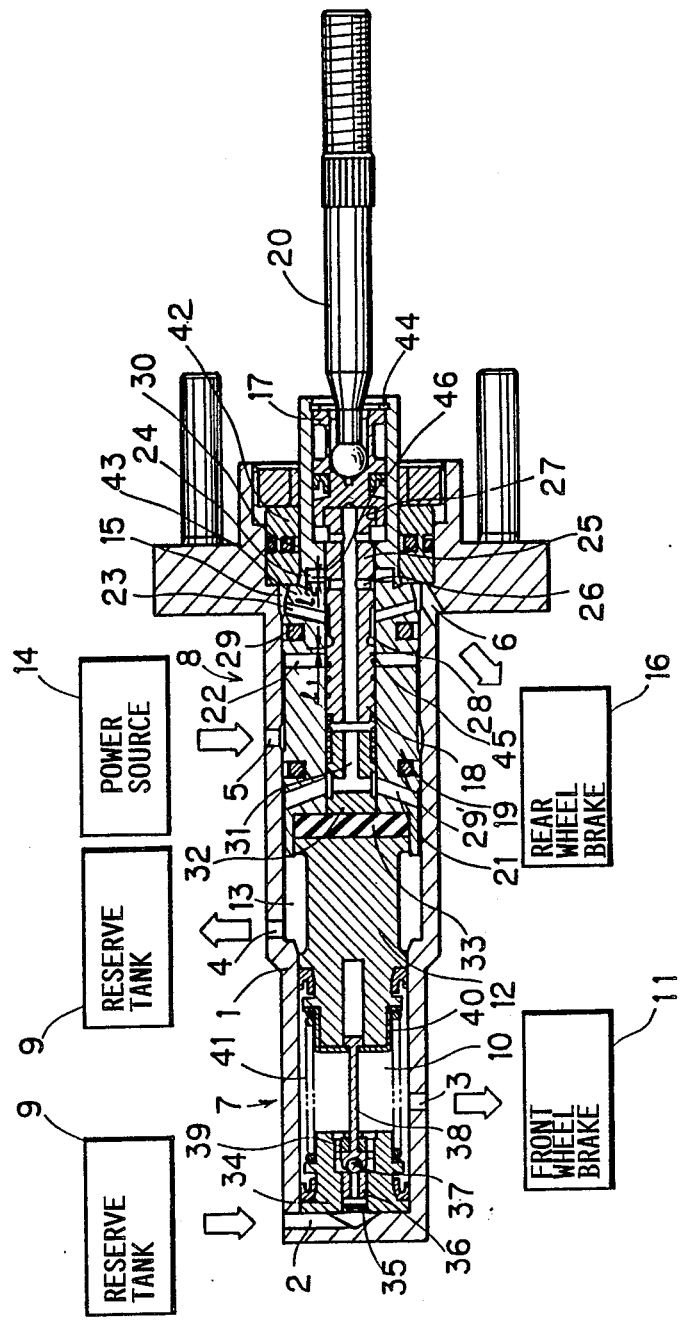
FIG. 9 is a sectional view showing a conventional hydraulic booster.

Referring to FIG. 1, elements identical or corresponding to those shown in FIG. 9 are indicated by the same reference numerals, thereby to avoid a redundant description.

The difference between the first embodiment of the present invention shown in FIG. 1 and the conventional hydraulic booster shown in FIG. 9 will now be described. An input member 17 which is coupled with an input rod 20 is provided with a communication hole 47 extending through its central portion and an elongated hole 50 diametrically passing through the same. A pin 49 is fixedly mounted on a rear end portion of a boost piston 19. This pin 49 passes through the elongated hole 50 of the input member 17.

A holder 51 is fixedly mounted on a rear end portion of a housing 1, to receive the input member 17 in the holder 51. When no pedal force is applied, the input member 17 is in contact with a bottom wall portion 52 of the holder 51, to stop its rearward movement, as shown in FIG. 1. With these features the invention differs from the prior art of FIG. 9.

When no pedal force is applied as shown in FIG. 1, a clearance is axially defined between a shoulder portion 43 of the boost piston 19 and a seal cap 57 which is fixed to the housing 1. In this state, an urging force for rearwardly pushing the boost piston 19 is so balanced with a force for frontwardly pushing the boost piston 19 by boost pressure in a boost chamber 15, that any rearward movement of the boost piston 19 is stopped. The boost piston 19 is rearwardly pushed by a resultant force applied by a master spring 41 and a force caused by auxiliary dynamic pressure acting on a difference between the sealing effective diameters of seals 29 and 30 (29>30) of the boost piston 19.

In the inactive state shown in FIG. 1 without any application of a pedal force, an input hole 22 of the boost piston 19 axially coincides in position with an input edge 45 of a spool 18, whereby an input directional control valve defined by these elements is in a boundary position between open and closed states. When the boost piston 19 moves slightly rearwardly from this state, the input directional control valve is opened so that the boost pressure in the boost chamber 15 is increased, whereby the input directional control valve immediately returns to the boundary portion. At this time, an output directional control valve, which is defined by an output hole 24 of the boost piston 19 communicating with the boost chamber 15 and an output edge 46 of the spool 18, is closed.

Dissimilarly to the plunger 32 shown in FIG. 9, a plunger 32 of the first embodiment shown in FIG. 1 does not have any communication hole. In the first embodiment of the present invention, the boost chamber 15 communicates with a reserve tank 9 through the output hole 24 of the boost piston 19, a communication hole 26 and a central communication hole 25 of the spool 18, a communication hole 47 of the input member 17, the outer peripheral portion of the boost piston 19 and a port 48 of the housing 1.

As shown in FIG. 1, the master piston 12 has an elongated hole 54 passing diametrically through the piston 12. A pin 53 is fixedly mounted on the housing 1, to pass through the elongated hole 54. The master piston 12 is further provided with a movable poppet valve disc 56 which can close a fluid passage 55 and a spring 58 urging the poppet valve disc 56 in an opening direction. In the inactive state shown in FIG. 1, the rear end portion of the poppet valve disc 56 is in contact with a pin 53 which is fixed to the housing 1, thereby to open the passage 55. When the master piston 12 moves forwardly or frontwardly from this state, the poppet valve disc 56 is pushed by the spring 58, to close the passage 55.

It is assumed here that a braking operation is started from the inactive state in the hydraulic booster shown in FIG. 1. In this case, a pedal force is transmitted to the input rod 20, to cause a frontward movement of the input member 17 and of the spool 18. Upon a slight frontward movement of the input member 17 and the spool 18, the input directional control valve defined by the input hole 22 of the boost piston 19 and the input edge 45 of the spool 18, is opened to start a boosting operation. Namely, no travel loss is caused before opening of the input directional control valve dissimilarly to the conventional hydraulic booster shown in FIG. 9, whereby a good pedal feeling is obtained.

When a normal boosting operation is started in the boost chamber 15, the boost piston 19 moves frontwardly so that its thrust is transmitted to the master piston 12 through a reaction disc 33. Consequently, the master piston 12 also starts to move frontwardly so that the poppet valve disc 56 closes the passage 55. Thus, communication between a pressure chamber 10 of the master cylinder 7 and the reserve tank 9 is cut off, so that hydraulic pressure is generated in the pressure chamber 10 to be outputted at a port 3.

When the output directional control valve is formed by a spool valve as in the first embodiment shown in FIG. 1, leakage of working fluid is caused between bores of the spool 18 and the boost piston 19. In the inactive state there is not any pedal force applied. Therefore, a boost pressure required for positioning the boost piston 19 must be retained in the boost chamber 15, and any leakage of the working fluid must be compensated by regularly supplying working fluid from an auxiliary power source 14 to the boost chamber 15. Such leakage can be prevented.

FIG. 2 is a sectional view showing a second embodiment of the present invention, which prevents such leakage of the working fluid. In the second embodiment shown in FIG. 2, an output directional control valve includes a differential pressure regulating valve, which suppresses input pressure by the level of boost pressure applied during positioning of a boost piston 19 by boost piston positioning means and outputting the boost pressure. The remaining structure of this embodiment is identical to that of the first embodiment.

An output directional control valve which is defined by a boost chamber 15, an output hole 24 of a boost piston 19 and an output edge 46 of a spool 18, includes a differential pressure regulating valve 59.

FIG. 3 shows the differential pressure regulating valve 59 in an enlarged manner. This differential pressure regulating valve 59 comprises a valve seat 60 which is press-fitted in and fixed to the boost piston 19, a globe valve disc 61 which can contact the valve seat 60 and a spring 62 for urging the globe valve disc 61 in a closing direction. These elements are so selected that force applied by boost pressure to a sealing effective area between the valve seat 60 and the globe valve disc 61 is equalized to the urging or biasing force of the spring 62.

In the second embodiment shown in FIGS. 2 and 3, the differential pressure regulating valve 59 retains the boost pressure in the inactive state between the boost chamber 15 and the directional control valve defined by the output hole 24 and the output edge 46 of the spool 18. Thus, no auxiliary dynamic pressure is wasted by leakage of working fluid, dissimilarly to the first embodiment.

FIG. 4 is a sectional view showing a third embodiment of the present invention, wherein waste of auxiliary dynamic pressure is also avoided by preventing leakage of working fluid. On the one hand, in the second embodiment, the differential pressure regulating valve 59 is added to the directional control valve defined by the output hole 24 of the boost piston 19 and the output edge 46 of the spool 18. In the third embodiment shown in FIG. 4, on the other hand, these two valves are combined into a single valve. The other features of the third embodiment are substantially identical to those of the second embodiment.

Referring to FIG. 4, a holder 51 receiving an input member 17 and a rear end portion of a boost piston 19 is fixed to a housing 1 by a nut 71. In the inactive state shown in FIG. 4 without any application of pedal force, the rear end portion of the input member 17 is in contact with the nut 71, thereby to stop a rearward movement of the input member 17.

Auxiliary dynamic pressure from an auxiliary power source 14 is introduced into a boost chamber 15 through a port 5 of the housing 1, the outer peripheral portion of the boost piston 19, an input hole 22, a small groove 28 of a spool 18 and a communication hole 23 of the boost piston 19. The third embodiment is similar to the first and second embodiments in this respect. The difference between the first and second embodiments resides in that the auxiliary dynamic pressure from the auxiliary power source 14 is also introduced into an output directional control valve 64 which is defined within the spool 18 and the input member 17 through a communication hole 63.

Figure 5:
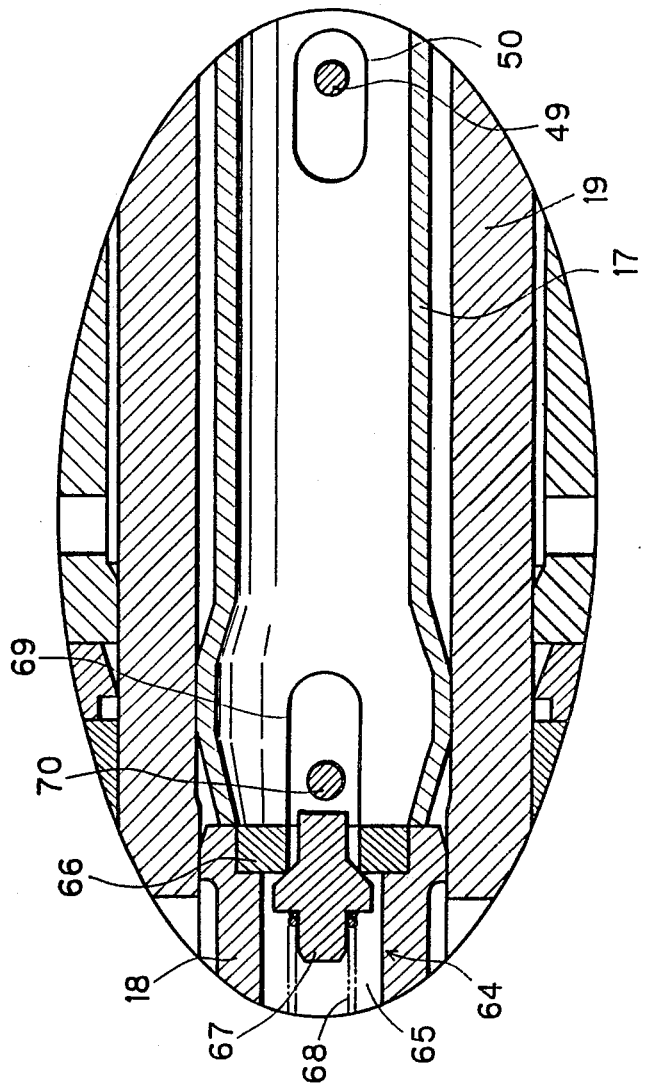
FIG. 5 is a plan view showing the structure of a part relating to a spool and an input member shown in FIG. 4.
Figure 6:
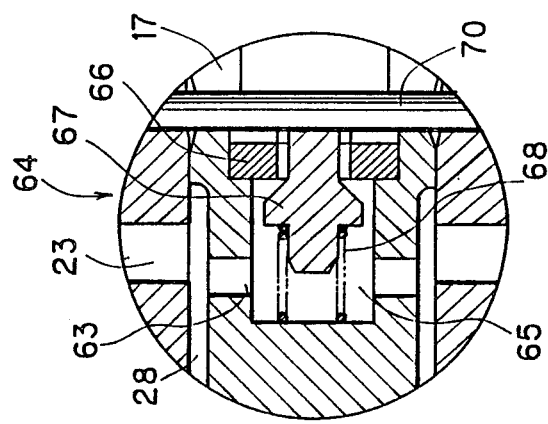
FIG. 6 is an enlarged view of an output directional control valve shown in FIG. 4.

FIG. 5 is a plan view showing the structure of a part relating to the output directional control valve 64 shown in FIG. 4. FIG. 6 illustrates the output directional control valve 64 in an enlarged manner. The output directional control valve 64 is opened in the state shown in FIGS. 4 and 5, while being closed in the state shown in FIG. 6.

Referring to FIGS. 4 and 6, the spool 18 is provided in its rear end portion with a chamber 65 and a valve seat 66 which is fixed to the chamber 65. The chamber 65 contains a movable valve disc 67 which can be in contact with the valve seat 66 and a spring 68 for urging the movable valve disc 67 in a closing direction. The input member 17 is provided in its forward end portion with a groove 69 diametrically passing through the input member 17. A positioning pin 70, which passes through the groove 69, is fixedly mounted on the boost piston 19.

When the directional control valve 64 is closed as shown in FIGS. 4 and 5, communication between the boost chamber 15 and a reserve tank 9 is cut off. When the output directional control valve 64 is opened as shown in FIG. 6, on the other hand, the boost chamber 15 communicates with the reserve tank 9 through the communication hole 23, the small groove 28, the communication hole 63, the chamber 65, a communication hole 47, the outer peripheral portion of the boost piston 19 and a port 48 of the housing 1.

In an inactive state shown in FIGS. 4 and 5 without any application of a pedal force, the movable valve disc 67 is separated from the positioning pin 70. Thus, the movable valve disc 67 is urged by the spring 68 and subjected to boost pressure which is required for positioning the boost piston 19 in contact with the fixed valve seat 66 and closed to avoid any leakage of working fluid. Therefore, auxiliary power is not wasted.

When a braking operation is started in the state shown in FIGS. 4 and 5, the input member 17 moves relatively frontwardly with respect to the boost piston 19. Consequently, an input directional control valve defined by the input hole 22 of the boost piston 19 and an input edge 45 of the spool 18, is opened to increase the boost pressure, thereby to start a boosting operation.

When the pedal force is reduced, on the other hand, the input member 17 moves relatively rearwardly moves with respect to the boost piston 19. Consequently, the movable valve disc 67 is brought into contact with the positioning pin 70, to be separated from the valve seat 66. Thus, the output directional control valve 64 is opened to reduce the boost pressure.

FIG. 7 is a sectional view showing a fourth embodiment of the present invention. In each of the aforementioned embodiments, the input and output directional control valves are contained in the boost piston 19. In the fourth embodiment shown in FIG. 7, a spool valve serving as an input or output directional control valve is arranged in parallel to a boost piston 104 on the outside of the boost piston. The spool valve is coupled with the boost piston by a lever mechanism, similarly to the apparatus disclosed in Japanese Patent Laying-Open Gazette No. 145655/1984.

Referring to FIG. 7, a housing 101 contains an input member 103 which is engaged with an input rod 102 and a boost piston 104. The input member 103 is relatively movably contained in the boost piston 104 in a coaxial relationship. An O-ring 107 is provided on the outer surface of the input member 103, in order to maintain fluid tightness between the input member 103 and the boost piston 104. Boost pressure generated in a boost chamber 108 acts on a seal portion of the O-ring 107. In other words, the input member 103 is urged rearwardly by the boost pressure acting on the sealing effective diameter of the O-ring 107.

A stopper 106 is fixedly mounted on a housing 101, while a spring bearing 109 is fixedly mounted on the input rod 102. A return spring 105 is provided between the stopper 106 and the spring bearing 109. In the inactive state shown in FIG. 7 without any application of pedal force, the input member 103 is urged rearwardly by boost pressure which is required for positioning the boost piston 104, while being subjected to the rearwardly biasing force of the return spring 105. The input member 103 is in contact with the stopper 106 which is fixed to the housing 101, to stop a rearward movement of the input member.

The housing 101 further contains a master piston 110 and a master spring 111 arranged in a pressure chamber 115. The biasing force of the master spring 111 is transmitted to the boost piston 104 through the master piston 110 and a rod 112. Seals 113 and 114 are provided between the outer surface part of the boost piston 104 and the housing 101. In the inactive state shown in FIG. 7 without any application of pedal force, the biasing force of the master spring 111 for rearwardly urging the boost piston 104, is balanced by boost pressure acting on an area defined by adding an effective area of the O-ring 107 the difference between the effective sealing areas of the seals 113 and 114, for rearwardly positioning the boost piston 104.

The master piston 110 is provided with a fixed valve seat 116 and a valve disc 117 which can be in contact with the valve seat 116.

The housing 101 further contains a sleeve 118, a spool 119 and a spool input member 120 extending in parallel to the boost piston 104. The sleeve 118 is fixed to the housing 101. The spool 119 is coupled to the spool input member 120 so that it is relatively movable within the sleeve 118. Further, a plug 121 is fixedly mounted on the housing 101.

A first lever 122 and a second lever 124 connect the mechanism relating to the boost piston 104 and the input member 103, with the mechanism relating to the spool 119. The first lever 122 has an end supported by the plug 121 which is fixed to the housing 101 and another end supported by the input member 103. The first lever 122 is rotatable about a support point 123. Thus, when the input member 103 moves frontwardly from the state shown in FIG. 7, the first lever 122 rotates clockwise about the support point 123.

The second lever 124 has an end supported by the spool input member 120 and another end supported by the boost piston 104. The second lever 124 is also rotatable about the support point 123. If the input member 103 moves relatively frontwardly with respect to the boost piston 104, the first lever 122 rotates clockwise about the support point 123, as hereinabove described. A coupling point between the first lever 122 and the plug 121 remains immobile at this time, whereby the support point 123 moves frontwardly following the clockwise rotation of the first lever 122. Further, a coupling point between the second lever 124 and the boost piston 104 remains stopped, whereby the second lever 124 rotates counterclockwise about the support point 123 following the frontward movement of the support point 123. In response to the counterclockwise rotation of the second lever 124, the spool input member 120 moves frontwardly and the spool 119 also moves relatively frontwardly within the sleeve 118.

FIG. 8 shows a part relating to the spool 119 in an enlarged manner. Referring to FIGS. 7 and 8, the sleeve 118 is provided with an inlet hole 126 for introducing auxiliary dynamic pressure from an auxiliary power source 125 into the spool 119 and a communication hole 127 for connecting the spool 119 with a reserve tank 137. Further, a passage 130 is provided in the internal surface of the sleeve 118, which is in contact with the outer surface of the spool 119.

The spool 119 is provided with passages 129, 131 and 132. Further, a positioning member 133 is press-fitted in and fixed to the forward end of the spool 119. In addition, a movable valve disc 135 and a spring 134 are contained in the forward end portion of the spool 119. The spring 134 urges the movable valve disc 135 toward the positioning member 133. In correspondence to the movable valve disc 135, the sleeve 118 is provided with a valve seat 136.

When the spool 119 moves relatively frontwardly within the sleeve 118 as hereinabove described, an input directional control valve, which is defined by the introduction hole 126 of the sleeve 118 and an input edge 128 of the spool 119, is opened. Consequently, auxiliary dynamic pressure from the auxiliary power source 125 is introduced into the boost chamber 108 through the passages 129, 130, 131 and 132, whereby the boost pressure is increased.

The movable valve disc 135 contained in the spool 119 and the valve seat 136 fixed to the sleeve 118 define an output directional control valve. This output directional control valve is closed in the inactive state shown in FIG. 7 and in a position that the spool 119 relatively frontwardly with respect to the sleeve 118. In this case, the movable valve disc 135 is urged by the boost pressure to contact the valve seat 136, thereby to prevent leakage of working fluid to the reserve tank 137.

When the boost pressure is increased and the boost piston 104 moves frontwardly following a frontward movement of the input member 103, the master piston 110 is also moved frontwardly by the rod 112. The valves seat 116, which is fixed to the master piston 110, is brought into contact with the valve disc 117, to close a fluid passage. Thus, communication between the pressure chamber 115 and the reserve tank 137 is cut off, whereby hydraulic pressure in the pressure chamber 115 is increased to be outputted through a port 138 into a wheel brake 138'.

When the pedal force is relaxed and the input member 103 moves relatively rearwardly with respect to the boost piston 104, the first lever 122 rotates counterclockwise about the support point 123, whereby the second lever 124 rotates clockwise about the support point 123. Consequently, the spool input member 120 moves rearwardly while the spool 119 also moves rearwardly as shown in FIG. 8.

FIG. 8 shows such a state that the spool 119 moves relatively rearwardly with respect to the sleeve 118. In this state, the input directional control valve defined by the introduction hole 126 and the input edge 128, is closed and the output directional valve defined by the movable valve disc 135 and the valve seat 136, is opened. Thus, the boost pressure is reduced as desired.

Also in the fourth embodiment shown in FIGS. 7 and 8, the input directional control valve is in a critical position between open or closed states in the inactive state without any application of a pedal force, whereby travel loss in an initial stage of braking operation is prevented. Further, no waste of auxiliary dynamic pressure is caused by leakage of the working fluid from the output directional control valve, similarly to the second and third embodiments.

Although the present invention has been described and illustrated in detail with reference to four embodiments, it is clearly understood that the same is by way of illustration and example only and is not to be taken by way of limitation, the spirit and scope of the present invention being limited only by the terms of the appended claims.

What is claimed is:

1. A hydraulic booster having a boost chamber and means for receiving auxiliary dynamic pressure from an auxiliary power source in response to an operation of a brake pedal for generating a boost pressure proportional to a pedal force in said boost chamber for assisting a thrust of a master cylinder by said boost pressure, said hydraulic booster comprising a boost piston in said boost chamber, said boost piston having a rear end portion facing said boost chamber for receiving the thrust of said boost pressure to move in a forward direction for urging a master piston of said master cylinder also in a forward brake force applying direction; an input member movable in said boost chamber with respect to said boost piston for receiving input effective in a forward direction, said input being proportional to said pedal force, said input member receiving a rearwardly effective reaction force proportional to said boost pressure; pressure regulating means having an input directional control valve for controlling communication between said boost chamber and said auxiliary power source and an output directional control valve for controlling communication between said boost chamber and a reserve tank being open to the atmosphere for increasing said boost pressure by opening said input directional control valve and closing said output directional control valve when said input member is relatively positioned ahead of a prescribed position with respect to said boost piston while reducing said boost pressure by closing said input directional control valve and opening said output directional control valve when said input member is relatively positioned behind a prescribed position with respect to said boost piston; a housing containing said boost chamber and said boost piston, said input member and said pressure regulating means in its interior; input member positioning means for bringing a rear end of said input member into contact with said housing or a stop member anchored to said housing for stopping a rearward movement of said input member when said pedal force is zero; and boost piston positioning means for balancing a force for rearwardly pushing said boost piston with a force for frontwardly pushing said boost piston by said boost pressure for stopping a rearward movement of said boost piston when said pedal force is zero, so that travel loss and a respective waste of auxiliary dynamic pressure are reduced to a minimum and a spongy brake pedal feeling is avoided.

2. The hydraulic booster in accordance with claim 1, wherein said output directional control valve includes a differential pressure regulating valve for suppressing input pressure by the level of boost pressure applied when said boost piston is being positioned by said boost piston positioning means and for outputting said boost pressure.

3. The hydraulic booster in accordance with claim 1, wherein said output directional control valve includes a fixed valve seat, a movable valve disc which is closed when contacting said fixed valve seat and receiving said boost pressure in a closing direction when said movable valve disc is closed, and movable valve disc operating means for closing said movable valve disc when said input member is relatively positioned ahead of a prescribed position with respect to said boost piston, and for opening said movable valve disc when said input member is relatively positioned behind a prescribed position with respect to said boost piston, and for closing said movable valve disc again when said boost piston is being positioned by said boost piston positioning means.

* * * * *